(12) United States Patent
Barry et al.

(10) Patent No.: US 7,373,978 B2
(45) Date of Patent: May 20, 2008

(54) METHOD FOR DRILLING AND COMPLETING WELLS

(75) Inventors: Michael D. Barry, The Woodlands, TX (US); Jon Blacklock, Katy, TX (US); Karen Chandler, Sugar Land, TX (US); Bruce A. Dale, Sugar Land, TX (US); Matt M. DiPippo, Houston, TX (US); Michael T. Hecker, Tomball, TX (US); Ben L. Martin, III, Orange Beach, AL (US); Thomas B. Martin, The Woodlands, TX (US); Darren F. Rosenbaum, Doha (QA); Chris E. Shuchart, Missouri City, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 8 days.

(21) Appl. No.: 10/545,219

(22) PCT Filed: Dec. 18, 2003

(86) PCT No.: PCT/US03/40349

§ 371 (c)(1),
(2), (4) Date: Jul. 10, 2006

(87) PCT Pub. No.: WO2004/079145

PCT Pub. Date: Sep. 16, 2004

(65) Prior Publication Data

US 2007/0068675 A1      Mar. 29, 2007

Related U.S. Application Data

(60) Provisional application No. 60/451,156, filed on Feb. 26, 2003.

(51) Int. Cl.
*E21B 43/04* (2006.01)

(52) U.S. Cl. .......................... 166/278; 166/51; 175/65
(58) Field of Classification Search ................ 166/278, 166/292, 293, 294, 51; 175/51, 65, 66, 18
See application file for complete search history.

(56) References Cited

U.S. PATENT DOCUMENTS 2,198,573 A    4/1940    Davis et al. .................... 166/1

(Continued)

FOREIGN PATENT DOCUMENTS

WO      WO 01/61148      8/2001

(Continued)

OTHER PUBLICATIONS

Ali, Syed et al. (2001) "High Productivity Horizontal Gravel Packs", Oilfield Review, Summer 2001, pp. 52-73.

(Continued)

*Primary Examiner*—Kenneth Thompson (57) ABSTRACT

A method for drilling and completing a gravel packed well is disclosed. The method comprises drilling a wellbore with a drilling fluid, conditioning the drilling fluid, running the gravel packing assembly tools to depth in the wellbore with the conditioned drilling-fluid, and gravel packing a wellbore interval with a completion-fluid. The completion fluid may be the same as the drilling-fluid. This method may be combined with alternate-path sand screen technology to ensure proper distribution of the gravel pack.

63 Claims, 11 Drawing Sheets

U.S. PATENT DOCUMENTS

| | | | |
|---|---|---|---|
| 3,486,560 A * | 12/1969 | Hutchison et al. | 166/292 |
| 3,675,717 A | 7/1972 | Goins, Jr. et al. | 166/278 |
| 3,892,275 A | 7/1975 | Lybarger et al. | 166/250.01 |
| 4,579,668 A | 4/1986 | Messenger | 252/8.5 |
| 4,662,447 A | 5/1987 | Bolin | 166/278 |
| 4,725,372 A | 2/1988 | Teot et al. | 507/129 |
| 4,735,731 A | 4/1988 | Rose et al. | 507/105 |
| 4,945,991 A | 8/1990 | Jones | 166/278 |
| 4,945,994 A | 8/1990 | Stagg | 166/369 |
| 5,089,151 A | 2/1992 | Hall et al. | 507/240 |
| 5,228,524 A | 7/1993 | Johnson et al. | 175/72 |
| 5,287,923 A * | 2/1994 | Cornette et al. | 166/278 |
| 5,363,916 A | 11/1994 | Himes et al. | 166/276 |
| 5,373,899 A | 12/1994 | Dore' et al. | 166/278 |
| 5,375,661 A | 12/1994 | Daneshy et al. | 166/278 |
| 5,551,516 A | 9/1996 | Norman et al. | 166/308.2 |
| 5,842,528 A * | 12/1998 | Johnson et al. | 175/45 |
| 5,979,557 A | 11/1999 | Card et al. | 166/300 |
| 5,981,447 A * | 11/1999 | Chang et al. | 507/271 |
| 6,110,875 A | 8/2000 | Tjon-Joe-Pin et al. | 507/201 |
| 6,138,760 A | 10/2000 | Lopez et al. | 166/300 |
| 6,164,380 A * | 12/2000 | Davis | 166/312 |
| 6,218,342 B1 | 4/2001 | Patel | 507/129 |
| 6,220,345 B1 | 4/2001 | Jones et al. | 166/51 |
| 6,302,209 B1 | 10/2001 | Thompson et al. | 166/305.1 |
| 6,382,319 B1 * | 5/2002 | Hill et al. | 166/278 |
| 6,399,546 B1 | 6/2002 | Chang et al. | 507/240 |
| 6,435,277 B1 | 8/2002 | Qu et al. | 166/281 |
| 6,482,866 B1 | 11/2002 | Dahayanake et al. | 516/77 |
| 6,562,764 B1 * | 5/2003 | Donaldson et al. | 507/277 |
| 6,571,875 B2 | 6/2003 | Bissonnette et al. | |
| 6,631,764 B2 | 10/2003 | Parlar et al. | 166/278 |
| 6,883,608 B2 | 4/2005 | Parlar et al. | 166/278 |
| 2002/0023752 A1 | 2/2002 | Qu et al. | 166/308 |

FOREIGN PATENT DOCUMENTS

| | | |
|---|---|---|
| WO | WO 2004/079145 | 9/2004 |
| WO | WO 2005/066299 | 7/2005 |

OTHER PUBLICATIONS

Campbell, S. et al. (2002) "Polymer-Free Fluids: A Case History of a Gas Reservoir Development Utilizing a High-Density, Viscous Gravel-Pack Fluid and Biopolymer-Free Reservoir Drilling Fluid", *IADC/SPE 74493*, Feb. 26-28, 2002, 13 pgs.

Daniel, S. et al. (2002) "New Visco-Elastic Surfactant Formulations Extend Simultaneous Gravel-Packing and Cake-Cleanup Technique to Higher-Pressure and Higher-Temperature Horizontal Open-Hole Completions: Laboratory Development and a Field Case History From the North Sea", *SPE 73770*, Feb. 20-21, 2002, 10 pgs.

Gilchrist, J.M. et al. (1998) "Advancing Horizontal Well Sand Control Technology: An OHGP Using Synthetic OBM", *SPE 48976*, Sep. 27-30, 1988, 12 pgs.

Hecker, M. T. et al. (2004) "Reducing Well Cost by Gravel Packing in Nonaqueous Fluid" *SPE 90758, SPE* Tech. Conf., Houston, TX, Sep. 26-29, 2004, 7 pgs.

Hurst, G. et al. (2004) "Alternate Path Completions: A Critical Review and Lessons Learned From Case Histories With Recommended Practices for Deepwater Applications", *SPE 86532, SPE* Int'l Symposium, Lafayette, LA, Feb. 18-20, 2004, 14 pgs.

Kelkar, S. et al. (2001) "Development of an Oil-Based Gravel-Pack Carrier Fluid", *SPE 64978, SPE* Int'l Symposium, Houston, TX, Feb. 13-16, 2001, 8 pgs.

Ladva, H. K. J. et al. (2001) "Use of Oil-Based Reservoir Drilling Fluids in Opneen-Hole Horizontal Gravel-Packed Completions: Damage Mechanisms and How to Avoid Them," *SPE 68959*, SPE European Formation Damage Conf., The Hague, The Netherlands, May 21-22, 2001, 16 pages.

Marken, C. D. et al. (1998) "Criteria for Background Production of Drilling Fluids Through San-Control Screens", *SPE 52885*, Jun. 2-3, 1997, pp. 250-257.

Murray, G. et al. (2002) "Development of the Alba Field—Evolution of Completion Practices, Part 2 Open Hole Completions; Successful Outcome—Drilling with SBM and Gravel Packing with Water Based Carrier Fluid", *SPE 73727*, Feb. 20-21, 2002, 12 pges.

Parlar, M. and Albino, E. (2000) "Challenges, Accomplishments, and Recent Developments in Gravel Packing", Distinguished Author Series, *SPE 57474*, Jan. 2000, pp. 50-58.

Parlar, M., et al. (2000) "Emerging Techniques in Gravel Packing Open-Hole Horizontal Completions in High-Performance Wells,"0 *SPE 64412*, SPE Asia Pacific Oil & Gas Conf., Brisbane, Australia, Oct. 16-18, 2000, 13 pgs.

Parlar, M., et al. (2004) "Gravel Packing Wells Drilled With Oil-Based Fluids: A Critical Review of Current Practices and Recommendations for Future Applications" *SPE 89815, SPE* Tech. Conf., Houston, TX, Sep. 26-29, 2004, 15 pgs.

Price-Smith, C. et al. (2000) "Laboratory Development of a Novel, Synthetic Oil-Based Reservoir Drilling and Gravel-Pack Fluid System That Allows Simultaneous Gravel-Packing and Cake-Cleanup in Open-Hole Completions," *SPE 64399, SPE* Asia Pacific Oil & Gas Conf., Brisbane, Australia, Oct. 16-18, 2000, 6 pages.

Wagner, M. et al. (2004) "Open-Hole Horizontal Drilling and Gravel-Packing With Oil-Based Fluids—An Industry Milestone", *SPE 87648*, SPE Int'l Symposium, Lafayeete, LA, Feb. 18-20, 2004, 16 pgs.

PCT International Search Report and Written Opinion.

Becker, Thomas E. et al. (1999) "Drill-In Fluid Filter-Cake behavior During the Gravel-Packing of Horizontal Intervals—A Laboratory Simulation", *SPE 50715*, International Symposium on Oilfield Chemistry, held in Houston, U.S.A., Feb. 16-19, 1999, 7 pages.

Brady, M.E. et al. (2000) "Near Wellbore Cleanup in Openhole Horizontal Sand Control Completions: Laboratory Experiments"*SPE 58785, SPE* International Symposium on Formation Damage held in Lafayette, Louisiana, Feb. 23-24, 2000, 8 pages.

Brady, M.E. et al. (2000) "Filtercake Cleanup in Open-Hole Gravel-Packed Completions: A Necessity or A Myth?" *SPE 63232, SPE* Annual Technical Conference and Exhibition held in Dallas, Texas, Oct. 1-4, 2000, 12 pages.

Cerasi, P. et al. (2001) "Measurement of the Mechanical Properties of Filtercakes", *SPE 68948, SPE* European Formation Damage Conference held in The Hague, The Netherlands, May 21-22, 2001, 12 pages.

Chambers, Mike R. et al. (2000) "Successful Application of Oil-based Drilling Fluids in Subsea Horizontal, Gravel-Packed Wells in West Africa" *SPE 58743, SPE* International Symposium on Formation Damage Control held in Lafayette, Louisiana, Feb. 23-24, 2000, 7 pages.

Godwin, Keith et al. (2002) "Simultaneous Gravel Packing and Filter-Cake Cleanup with Shunt Tubes in Openhole Completions: A Case History from the Gulf of Mexico" *SPE 78806, SPE* Drilling & Completion, Sep. 2002, 5 pages.

Jones, L.G. et al. (1997) "Gravel packing Horizontal Wellbores with Leak-Off using Shunts", *SPE 38640, SPE* Annual Technical Conference and Exhibition held in San Antonio, Texas, Oct. 5-8, 1997, 7 pages.

Marken, Craig et al. (1997) "Criteria for Back Production of Drilling Fluids through Sand Control Screens" *SPE 38187, SPE* European Formation Damage Conference held in The Hague, The Netherlands, Jun. 2-3, 1997, 14 pages.

Parlar, M. et al. (1998) "Laboratory Development of a Novel, Simultaneous Cake-Cleanup and Gravel-Packing System for Long, Highly-Deviated or Horizontal Open-Hole Completions", *SPE 50651, SPE* European Petroleum Conference held in The Hague, The Netherlands, Oct. 20-22, 1998, 15 pages.

Price-Smith, C. et al. (1998) "Open Hole Horizontal Well Cleanup in Sand Control Completions: State of the Art in Field Practice and Laboratory Development" *SPE 50673,SPE* European Petroleum Conference held in The Hague, The Netherlands, Oct. 20-22, 1998, 16 pages.

Schlumberger (1999) "Gravel Pack Carrier Fluid Options for Esso Applications", 8 pages. (Names of countries and names of fields, which are proprietary, have been redacted from the original ).

Schlumberger (2001) "Gravel Pack Carrier Fluid Options Proposed for Mobil Applications", 20 pages. (Names of countries and names of fields, which are proprietary, have been redacted from the original ).

Bennett, C. et al., "Design Methodology for Selection of Horizontal Open-Hole Sand Control Completions Supported by Field Case Histories", SPE 65140, 2000 SPE European Petroleun Conference, Oct. 24-25, 2000, pp. 1-19, Paris, France.

Dessus, J. L. et al., "Girassol: Drilling and Completion Experience gained through first 12 wells", OTC 14168, 2002 Offshore Technology Conference, May 6-9, 2002, pp. 1-14, Houston, Texas.

Moyer, M. C. et al., "Hoover-Diana Deepwater Drilling and Completions", OTC 13081, 2001 Offshore Technology Conference, Apr. 30-May 3, 2001, pp. 1-20, Houston, Texas.

* cited by examiner

METHOD FOR DRILLING AND COMPLETING WELLS

CROSS REFERENCE TO RELATED APPLICATIONS

This application is the National Stage of International Application No. PCT/US03/40349, filed Dec. 18, 2003, which claims the benefit of U.S. Provisional Patent Application No. 60/451,156, filed Feb. 26, 2003.

FIELD OF THE INVENTION

This invention generally relates to wellbores used for production of formation fluids. More particularly, this invention relates to well completion providing the ability to utilize one fluid for drilling the wellbore, running the gravel packing assembly and sand control screens, and then displacing and gravel packing the completion interval with the same or another fluid.

BACKGROUND

The proper fluids for drilling, gravel packing and sand screens installation are essential for well completion success. Careful planning, well preparation and completion execution are required to increase completion productivity and longevity. Historically, a minimum of three fluids has been used to drill and complete gravel packed wells. The first fluid is a solids-laden drilling-fluid used to drill the completion interval. The second fluid is a solids-free completion-fluid used to displace the solids-laden drilling-fluid and to run sand-exclusion equipment and gravel packing tools in a generally solids-free environment. The third fluid is a carrier fluid for the gravel during gravel packing of the completion interval.

In producing hydrocarbons a wellbore is drilled through a subterranean reservoir. Drilling practices can affect a gravel pack and sand screen the same way they can affect conventionally perforated wells. The well should be drilled to maintain wellbore stability, and drilling fluids should be used that will not damage the formation.

The drilling fluid typically contains weighting solids, viscosifying solids, and drilled solids at varying concentrations. Drilling fluid filtrates should be compatible with completion fluids and should not interfere with the completion operations. Preferably, the drilling fluid selected should be dense enough to result in a well that is slightly overbalanced, should have low fluid loss and should be compatible with the clays in the productive formation.

The proper preparation of a well for gravel packing can be the key to completion success. Cleanliness is one of the most important considerations in the preparation of gravel packs. The presence of any particulate materials can result in a damaged completion. Currently tanks are often dedicated to gravel pack use to avoid repeated cleaning operations for drilling mud removal.

Completion fluids are used to displace the solids-laden drilling fluid and to run sand-exclusion equipment and gravel packing tools in a generally solids-free environment. Completion fluids can be oil- or water-based fluids. The water-based fluids are usually considered to be more flexible. Their densities, viscosities, and formation compatabilities are more easily controlled than those of oil-based fluids. Therefore, water-based fluids are most commonly utilized.

Regardless of the source of the completion fluid, the fluid should contain minimum particulate material and its chemistry must be compatible with the rock formation and connate water. Fresh water may cause clays to swell or disperse, while the presence of some ions may cause precipitation when in contact with formation water. The most common sources of completion fluids are field or produced brine, seawater, bay water or fresh water. The density of the completion fluids is often controlled with soluble salts.

Gravel placement involves those operations required to transport gravel from the surface to the completion interval to form a downhole filter that will permit the flow of fluids into the well but will prevent the entry of formation sands. Preferably, the gravel placement provides a uniform pack with a porosity of thirty-nine percent or less.

The gravel placement requires fluid to transport the gravel slurry to the completion interval. Oil- and water-based fluids and foams are commonly used as the gravel placement fluid. Clean fluids are essential for gravel placement. Depending on well pressures, high-density, solids-free soluble salt solutions may be required to maintain well control. In addition, the gravel placement fluids can be viscified by adding polymers.

Poor distribution of the gravel slurry is often caused when carrier fluid from the slurry is lost prematurely into the more permeable portions of the formation and/or into the screen, itself, thereby causing "sand bridge(s)" to form in the well annulus around the screen. These sand bridges effectively block further flow of the gravel slurry through the well annulus thereby preventing delivery of gravel to all levels within the completion interval.

To alleviate poor gravel distribution, "alternate-path" well tools or technology have been proposed and are now in use which provide for uniform distribution of gravel throughout the entire completion interval notwithstanding sand bridges formation before completion of gravel distribution. Such devices typically include perforated shunts or by-pass conduits which extend along the length of the device and which are adapted to receive the gravel slurry as it enters the well annulus around the device. If a sand bridge forms before the operation is complete, the gravel slurry can still be delivered through the perforated shunt tubes (such as, "alternate-paths") to the different levels within the annulus, both above and/or below the bridge. U.S. Pat. Nos. 4,945,994 and 6,220,345 provides descriptions of typical alternate-path well screens and how they operate.

To summarize, the current method used to install open-hole gravel packs typically involves drilling the completion interval with water- or oil-based drilling fluid, displacing the fluid in the open-hole to a solids-free completion fluid (typically brine), running the gravel pack assembly and sand screens to depth in the solids-free completion fluid, and gravel packing the interval with a water-based carrier fluid. A common limitation of this method involves the inability to run the gravel pack assembly and sand screens to depth due to wellbore instability (collapse) caused by incompatibility between the water-based completion fluid (brine) and the formation. This method is inefficient since at least three fluids are required (drilling fluid, completion fluid, and gravel carrier fluid).

A frequent modification to the method described above involves placing a pre-drilled liner in the completion interval prior to displacing the open-hole to completion fluid and running the gravel pack assembly and sand screens (Murray, G., Morton, K., Blattel, S., Davidson, E., MacMillan, N., Roberts, J., SPE 73727, Feb. 20-21, 2002. Development of the Alba Field—Evolution of Completion Practices, Part 2 Open Hole Completions; Successful Outcome—Drilling with SBM and Gravel Packing with Water Based Carrier Fluid and Gilchrist, J. M., Sutton, Jr., L. W., Elliot, F. J., SPE 48976, Sep. 27-30, 1988. Advancing Horizontal Well Sand Control Technology: An OHGP Using Synthetic OBM.). The pre-drilled liner mitigates wellbore collapse and provides a conduit for running the gravel pack assembly and sand screens. While the pre-drilled liner improves the ability to run the gravel pack assembly and sand screens to depth, it provides an additional resistance to flow and may have a negative impact on productivity.

The current practice of using separate fluids for drilling, displacing the solids-laden drilling fluid and running sand-exclusion equipment and gravel packing tool, and gravel placement is both costly and time-consuming. Accordingly, there is a need to reduce operational complexity and time by simplifying the fluid system and eliminating the need for the pre-drilled liner. This invention satisfies that need.

SUMMARY

In an embodiment, the method comprises drilling a wellbore with a drilling fluid, conditioning the drilling fluid, running the gravel packing assembly tools to depth in a wellbore with the conditioned drilling fluid, and gravel packing an interval of the wellbore using a carrier fluid. The carrier-fluid may be the same as the drilling fluid. This method may be combined with alternate-path sand screen technology to ensure proper distribution of the gravel pack

DETAILED DESCRIPTION

The invention described herein provides a method for installing an open-hole gravel pack completion. The installation process involves drilling the completion interval with drilling fluid, conditioning the drilling fluid, running the gravel packing assembly and sand control screens to depth in the conditioned drilling fluid, then displacing and gravel packing the completion interval with the same or another fluid.

This new method for installing open-hole gravel pack completions addresses problems that have been experienced while attempting to run sand screens to depth in the wellbore prior to gravel packing. In addition, benefits of the new procedure include reduced completion time due to simplified operational procedures and potential elimination of a slotted liner.

Figure 1:
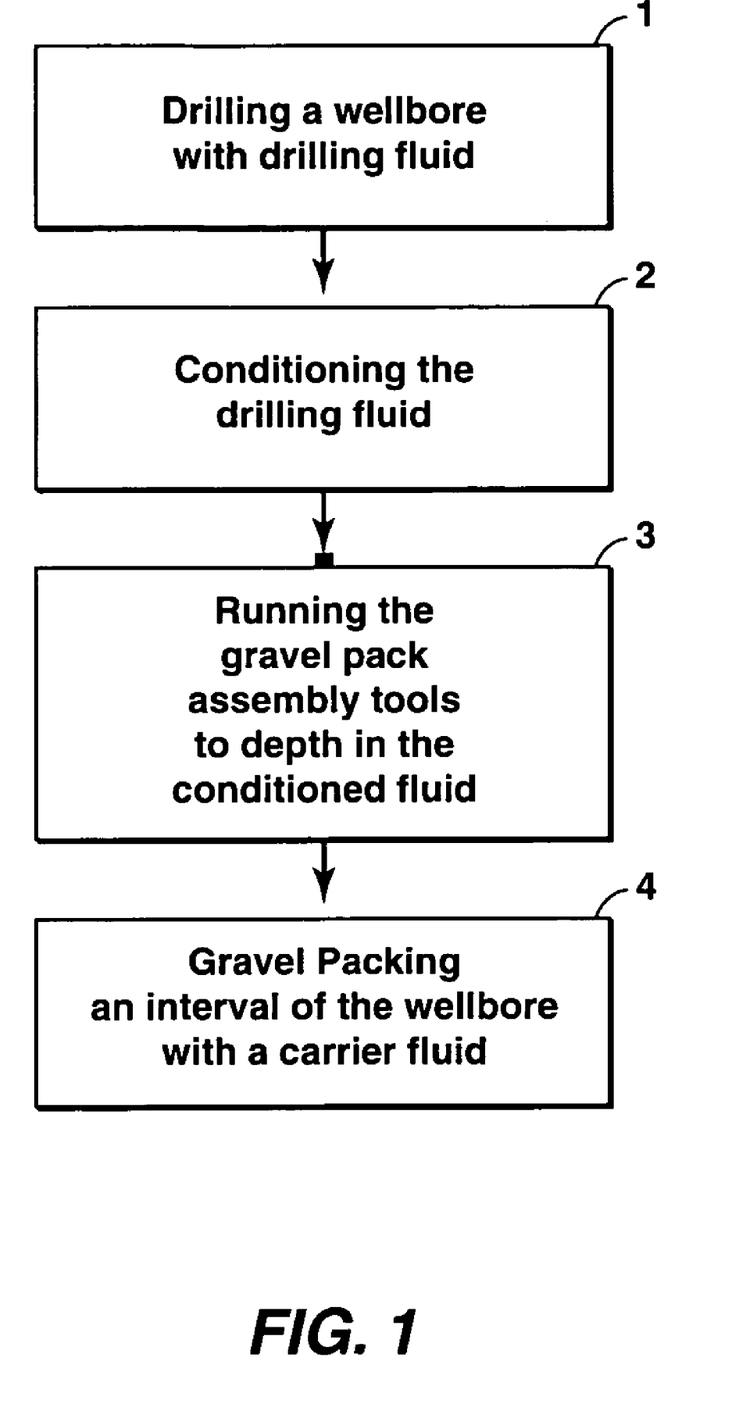
FIG. 1 is a flow chart of an embodiment of the invention.

As shown in FIG. 1, the method has four basic steps. First, a well is drilled in an interval through a subterranean formation with a drilling fluid 1, which may be referred to as an open-hole interval drilling fluid, non-aqueous fluid (NAF), and/or solids-laden fluid. Second, the drilling fluid is conditioned 2. Third, the gravel pack assembly tools are run to depth in the wellbore with the conditioned fluid 3, which may be referred to as conditioned drilling fluid. Fourth, an interval of the wellbore is gravel packed with a carrier fluid 4. The carrier fluid can be the same as the conditioned fluid or a separate fluid, which may be referred to and include neat fluid, neat gravel pack fluid, displacement fluid and/or solids-free fluid. If the wellbore does not need to be gravel packed a screen can be run to depth in the wellbore with the conditioned fluid with the fourth step no longer necessary.

The completion interval is drilled with either water-based or oil-based drilling fluid. After drilling the completion interval, the drilling fluid is circulated through the wellbore and filtered (or conditioned) using equipment on the rig floor. Typically, the drilling fluid contains particles (such as, drill cuttings) that may plug the openings (or slots) in the sand screen and potentially plug the gravel pack if not sufficiently removed. Therefore, the drilling fluid is conditioned (or filtered) before running the sand screens to preferably remove solid particles larger than approximately one-third the slot opening size and/or one-sixth the diameter of the gravel pack particle size.

The one-third slot size is based on the general rule of thumb for size of spherical particles required to bridge a given slot size. The one-sixth diameter of the gravel pack particle size is based on the general rule of thumb for the required size of pore throats in a pack of spherical particles at a given diameter to avoid plugging. For example, typical wire-wrapped sand screens have 8.5 gauge slots (approximately 215 microns) and 30/50 proppant (approximately 425 microns) may be used for the gravel packs. The drilling fluid can be conditioned over 310 mesh shaker screens (approximately 50 microns) on the drilling rig, which should sufficiently filter-out the oversized particles.

Also, during field operations, a screen tester apparatus may be utilized to check samples of the conditioned fluid to verify whether it freely passes through a screen sample with a specified slot size. Typically, the recommended slot size is 3 to 4 gauge sizes less than nominal screen slots. Once the fluid conditioning process is adequately verified using the screen tester apparatus, the gravel pack assembly and sand screens can be run to depth in the wellbore.

Running sand screens in conditioned-$_{13}$ fluid for stand-alone screen completions is a frequent operational practice for persons skilled in the art. For example, this practice is often conducted in the North Sea where gravel packing is not necessary due to the high permeability formations that have large sand grains with uniform size distributions. For open-hole completions that must be gravel packed due to heterogeneous formation with non-uniform grain size distributions, prior to this new method sand screens were not run in conditioned fluid.

After the gravel pack assembly and sand screens are run to depth, the open-hole interval fluid is typically displaced with a volume of neat fluid. Neat fluid is gravel carrier fluid not laden with gravel pack proppants. The displacement removes conditioned drilling fluid and drill cuttings that remain in the open-hole. The displacement fluid is circulated in a direction that does not direct solids-laden fluid through the screen in an effort to avoid screen plugging. For example, the fluid can be circulated down the annulus, through the crossover to the washpipe, down the washpipe of the screen assembly, and out the screen. Previously, open-hole gravel pack installation methods required the completion of the displacement operation before installing sand screens because previous methods assumed sand screens should be run in solids-free fluid.

After the open-hole interval is displaced, the completion interval is gravel packed using standard operational procedures. The pump rate for the gravel pack operation should be slower than the displacement rate to avoid screen plugging.

In addition, after the gravel pack assembly has been run and prior to the gravel packing operation, several gravel pack service tool manipulations must be performed, as discussed below in the example. The new method requires that the manipulations be performed in solids-laden fluid which was not done in previous methods (gravel pack assembly previously run in solids-free fluid).

In another embodiment, the invention involves drilling a completion interval in a wellbore with an oil-based drilling fluid and gravel packing an interval of the wellbore with a water-based carrier fluid using alternate-path technology. Compared to water-based fluids, oil-based fluid filter cakes have lower lift-off pressures that can be problematic for installing a complete gravel pack. Filter cake is a concentrated layer of solids from the drilling fluid that forms on the borehole wall opposite a permeable formation. Loss of the filtercake during gravel packing may result in the formation of a bridge. As described previously in the background section, alternate path allows transport of sand beyond the bridge. As a result, alternate-path technology is desirable for wells that are to be gravel packed and are drilled with oil-based fluid.

The water-based gravel pack carrier fluid should have favorable rheology for effectively displacing the conditioned fluid and favorable rheology and sand carrying capacity for gravel packing using alternate path technology. Examples of the water-based carrier fluid include but are not limited to a fluid viscosified with HEC polymer, xanthan polymer, viscoelastic surfactant (VES) or combinations thereof. Persons skilled in the art will recognize other carrier fluids that may be chosen because of their favorable properties.

In another embodiment, the gravel pack carrier fluid is oil-based. The method using the oil-based carrier fluid would be the same as described above with the water-based carrier fluid.

EXAMPLE

The invention was developed as a result of operational difficulties experienced while attempting to run the gravel pack assembly in a wellbore. The planned procedure for the wellbore was to drill the completion interval, displace to solids-free brine, run the gravel pack assembly and screens, then gravel pack the completion interval using water-based carrier fluid. However, after displacing the open-hole completion interval to completion brine, the gravel pack assembly and sand screens could not be run to depth after several attempts due to wellbore stability problems. Unsuccessful attempts were also made to run a pre-drilled liner. The wellbore was suspended and operations were moved to a nearby wellbore. After the experience at the first failed wellbore, a new completion procedure (the present inventive method) was developed and utilized for the nearby wellbore and subsequent wellbores. The new completion procedure has been successfully employed for multiple wells. Well tests have indicated that the new method provides an efficient, low-skin completion.

Figure 2:
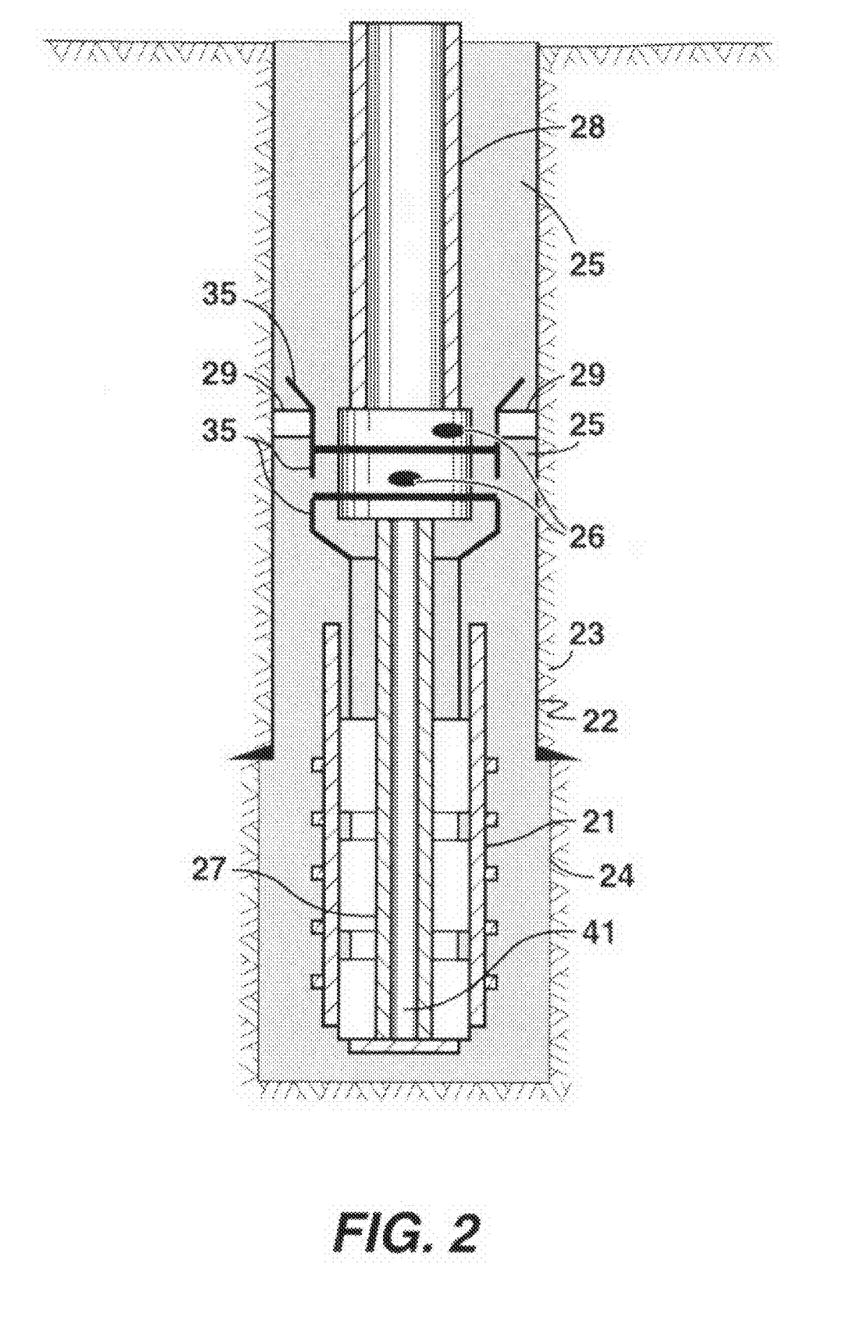
FIG. 2 is an illustration of a wellbore with a gravel pack using a two-fluid system illustrating the installation of an alternate-path sand screen in an oil-based conditioned fluid.

FIGS. 2 through 11 illustrate the two-fluid system well completion using an alternate path well screen in a field test wherein like elements of FIGS. 2 through 11 have been given like numerals. First, a well is drilled using a drilling fluid with techniques known to persons skilled in the art. Next, a well screen is installed in a wellbore filled with conditioned drilling fluid, such as non-aqueous fluid (NAF). FIG. 2 is an illustration of a screen 27 with alternate path technology 21 inside a wellbore 23, which is part of the gravel pack assembly. The gravel pack assembly consists of a screen 27, alternate path technology 21, a GP Packer 29, and a crossover tool 35 with fluid ports 26 connecting the drillpipe 28, washpipe 41 and the annulus of the wellbore 23 above and below the GP Packer 29. This wellbore 23 consists of a cased section having a casing 22 and a lower open-hole section 24. Typically, the gravel pack assembly is lowered and set in the wellbore 23 on a drillpipe 28. The NAF 25 in the wellbore 23 had previously been conditioned over 310 mesh shakers (not shown) and passed through a screen sample (not shown) 2-3 gauge sizes smaller than the gravel pack screen 27 in the wellbore 23.

Figure 3:
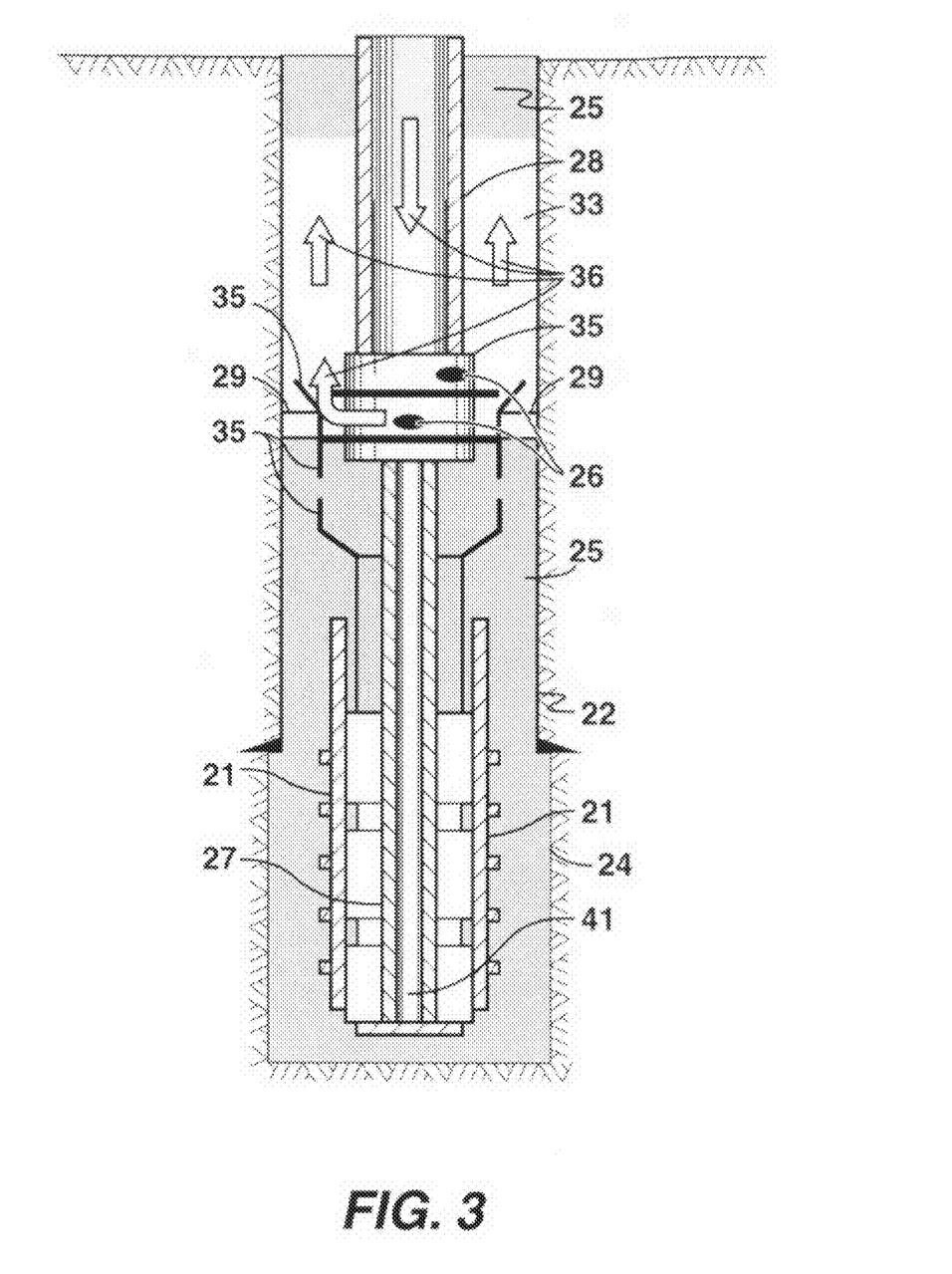
FIG. 3 is an illustration of a wellbore with a gravel pack using a two-fluid system illustrating the installation of a GP packer and the introduction of the neat gravel pack with the crossover tool in the reverse position.

As illustrated in FIG. 3, the GP packer 29 is set in the wellbore 23 directly above the interval to be gravel packed. The GP Packer seals the interval from the rest of the wellbore 23. After the GP Packer 29 is set, the crossover tool 35 is shifted into the reverse position and neat gravel pack fluid 33 is pumped down the drillpipe 28 and placed into the annulus between the casing 22 and the drillpipe 28, displacing the conditioned oil-based fluid, which is the NAF 25. The arrows 36 indicate the flowpath of the fluid.

Figure 4:
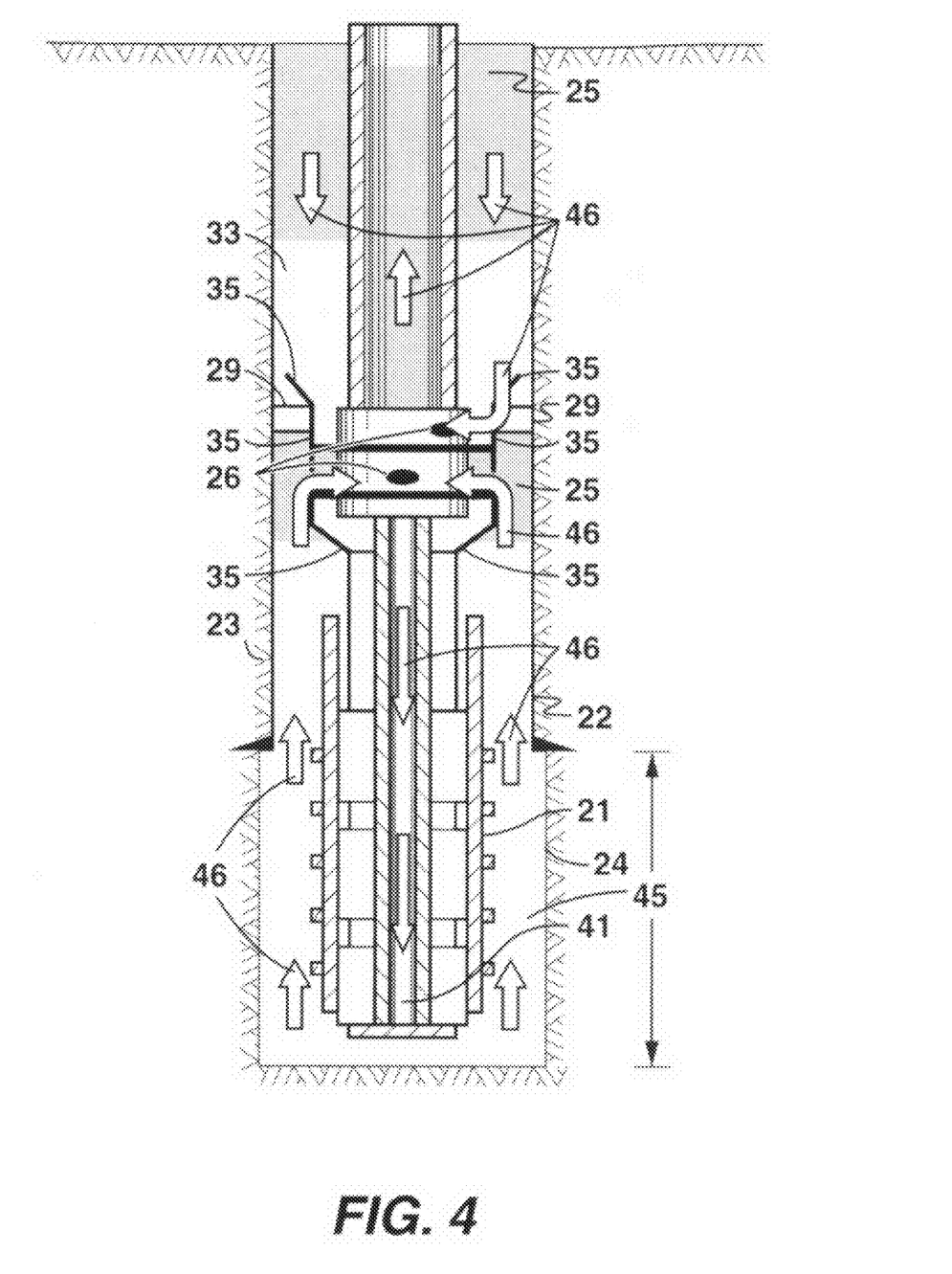
FIG. 4 is an illustration of a wellbore with a gravel pack using a two-fluid system illustrating the sweeping of mud from the open hole interval adjacent to the screens by the carrier fluid with the crossover tool in the circulating position.

Next, as illustrated in FIG. 4, the crossover tool 35 is shifted into the circulating position, which may also be referred to as the circulating gravel pack position or gravel pack position. Conditioned NAF 25 is then pumped down the annulus between the casing 22 and the drillpipe 28 pushing the neat gravel pack fluid 33 through the washpipe 41, out the screen screens 27, sweeping the open-hole annulus 45 between the alternate path technology 21 and the wellbore wall in open-hole section 24 and through the crossover tool 35 into the drillpipe 28. The arrows 46 indicate the flowpath through the open-hole section 24 and the alternate path technology 21 in the wellbore 23.

Figure 5:
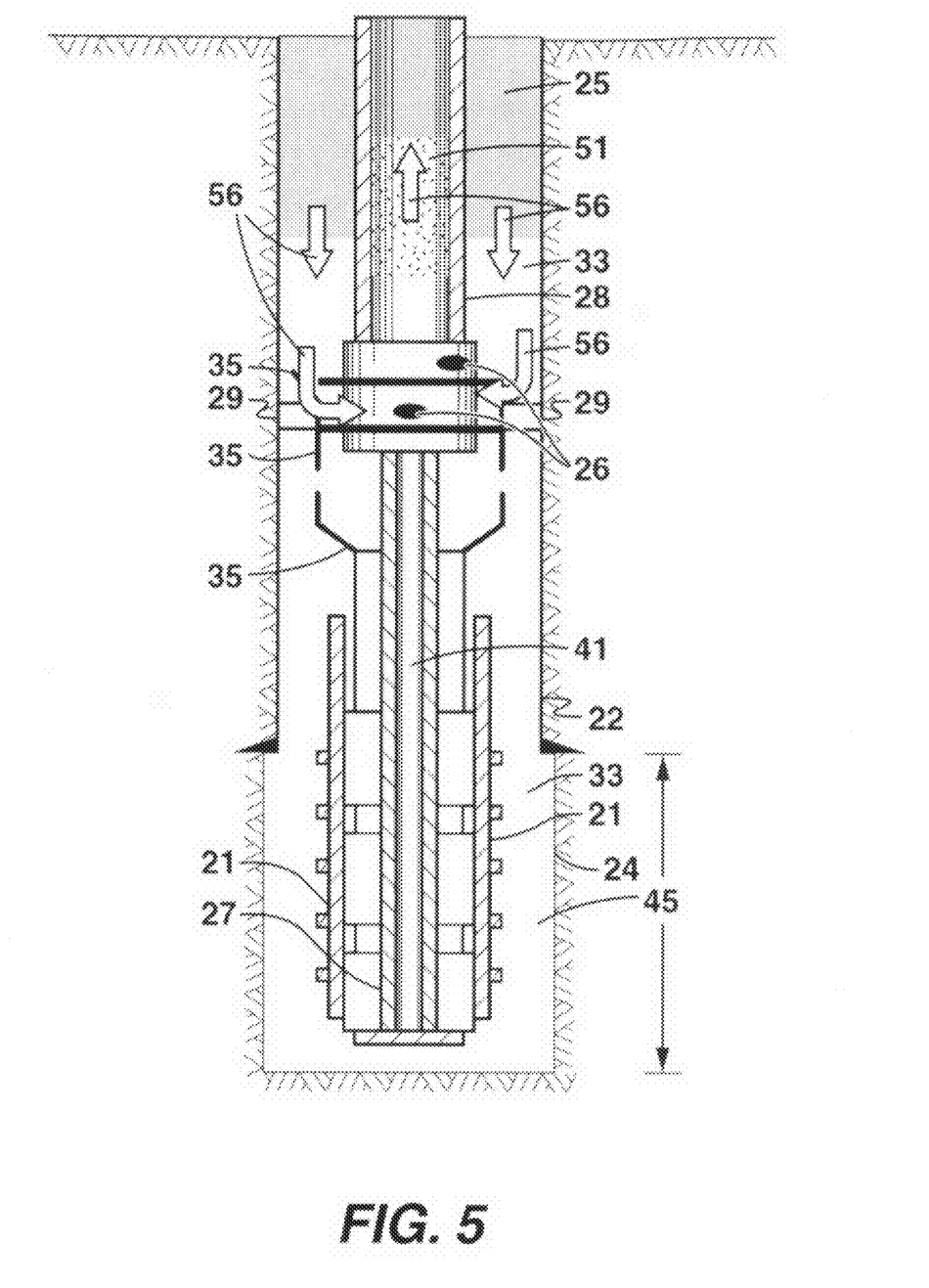
FIG. 5 is an illustration of a wellbore with a gravel pack using a two-fluid system illustrating the reverse position of the crossover tool after sweeping of mud from the open hole interval to reverse-out the remaining neat gravel pack fluid and the conditioned oil-based fluid.

As illustrated in FIG. 5, once the open-hole annulus 45 between the alternate path technology 21 and the wellbore wall in open-hole section 24 has been swept with neat gravel pack fluid 33, the crossover tool 35 is shifted to the reverse position. Conditioned NAF 25 is pumped down the annulus between the casing 22 and the drillpipe 28 causing a reverse-out by pushing NAF 25 and dirty gravel pack fluid 51 out of the drillpipe 28, as shown by the arrows 56.

Figure 6:
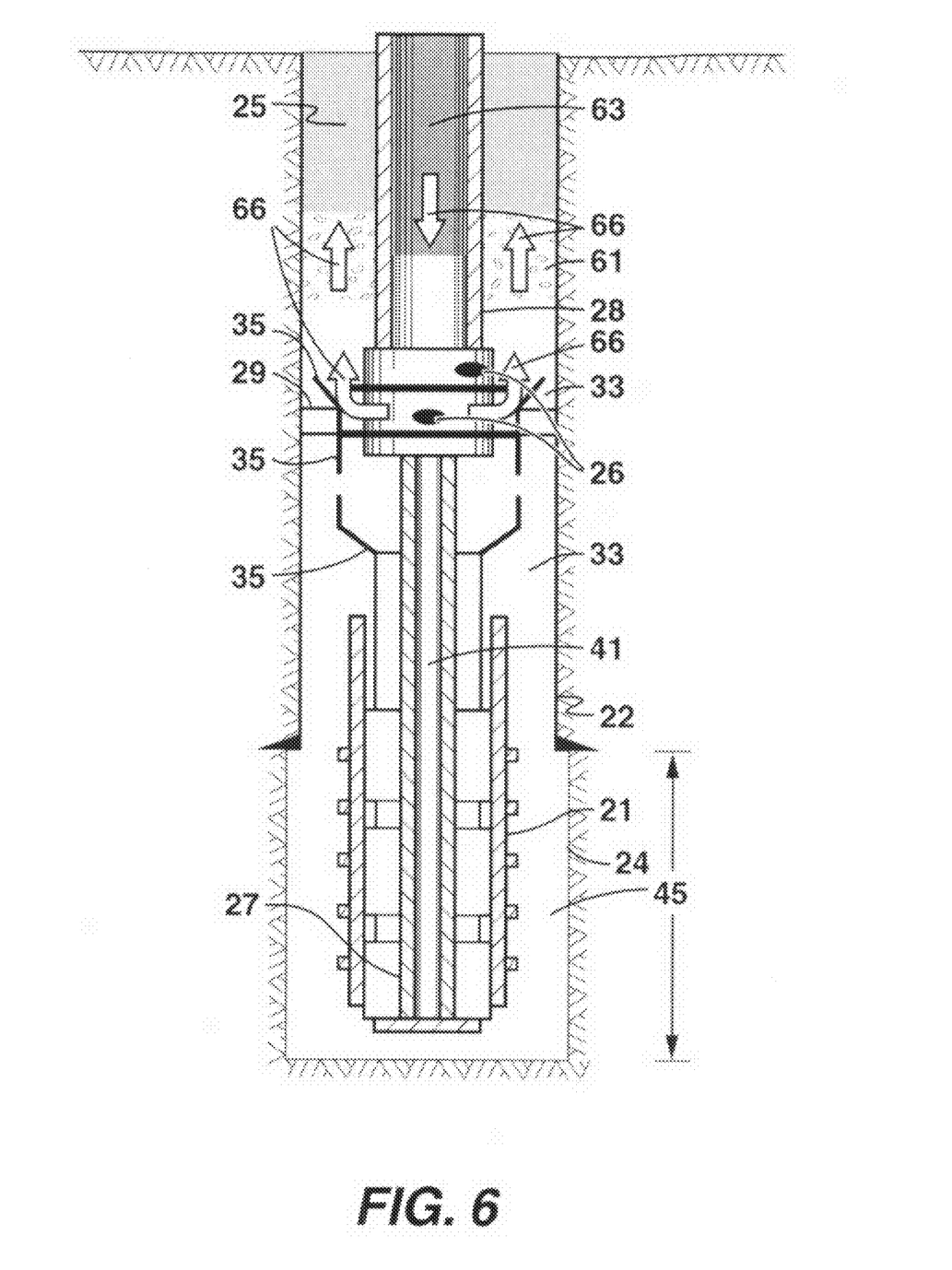
FIG. 6 is an illustration of a wellbore with a gravel pack using a two-fluid system illustrating the location of the viscous spacer, neat gravel pack fluid and the gravel pack slurry in the drillpipe with the crossover tool in the reverse position and placement of the gravel pack fluid in the annulus.

Next, as illustrated in FIG. 6, while the crossover tool 35 remains in the reverse position, a viscous spacer 61, neat gravel pack fluid 33 and gravel pack slurry 63 are pumped down the drillpipe 28. The arrows 66 indicate direction of fluid flow of fluid while the crossover tool 35 is in the reverse position. After the viscous spacer 61 and 50% of the neat gravel pack fluid 33 are in the annulus between the casing 22 and drillpipe 28, the crossover tool 35 is shifted into the circulating gravel pack position.

Figure 7:
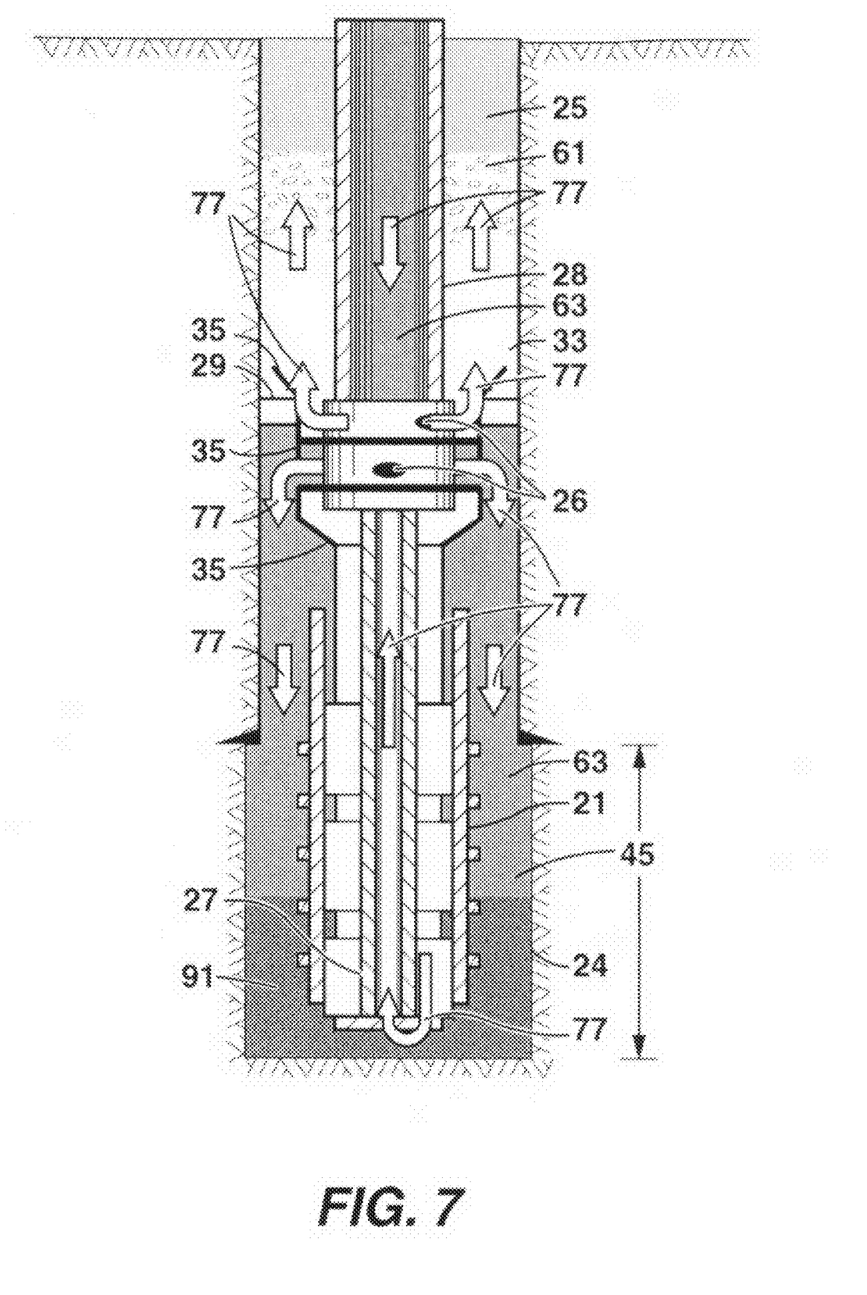
FIG. 7 is an illustration of a wellbore with a gravel pack using a two-fluid system illustrating the crossover tool in the circulating position to gravel pack the open-hole section of the wellbore annulus.

Next, as illustrated in FIG. 7, the appropriate amount of gravel pack slurry 63 to pack the open-hole annulus 45 between the alternate path technology 21 and the wellbore wall of the open-hole section 24 is pumped down the drillpipe 28, with the crossover tool 35 in the circulating gravel pack position. The arrows 77 indicate direction of fluid flow of fluid while the crossover tool 35 is in the gravel pack position. The pumping of the gravel pack slurry 63 down the drillpipe 28, forces the neat gravel pack fluid 33 through the screen 27, up the washpipe 41 and into the annulus between the casing 22 and the drillpipe 28. Conditioned NAF 25 returns are forced through the annulus between the casing 22 and the drillpipe 28 as the neat gravel pack fluid 33 enters the annulus between the casing 22 and the drillpipe 28.

Figure 8:
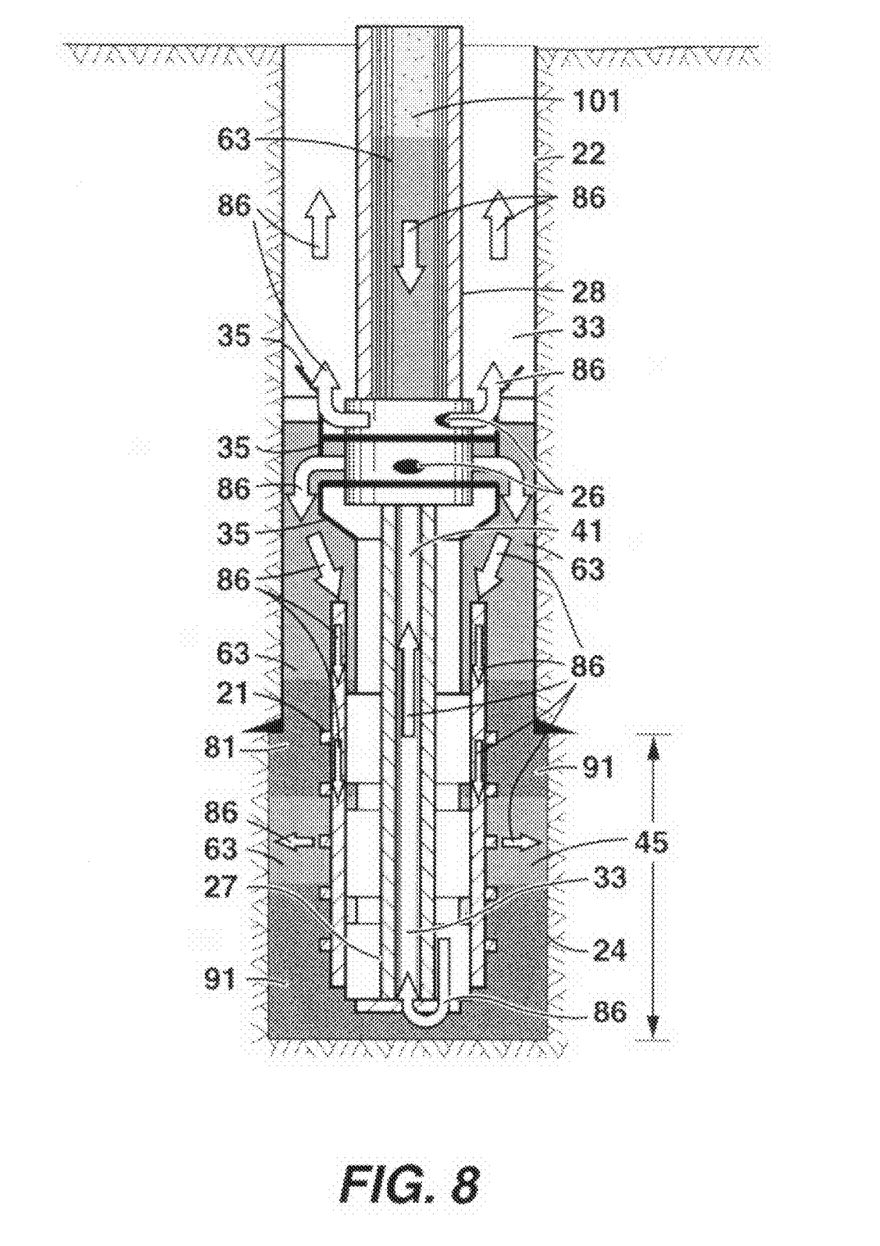
FIG. 8 is an illustration of a wellbore with a gravel pack using a two-fluid system illustrating the continued displacement of the neat gravel packing fluid out of the annulus and the diversion of a gravel pack slurry around a sand bridge.

As illustrated in FIG. 8, the gravel pack slurry 63 is then pumped down the drillpipe 28 by introducing a completion fluid 101 into the drillpipe 28. The gravel pack slurry 63 displaces the conditioned NAF (not shown) out of the annulus between the casing 22 and the drillpipe 28. Next, gravel is deposited in the open-hole annulus 45 between the alternate path technology 21 and the wellbore walls of the open-hole 24. If a sand bridge 81 forms as shown in FIG. 8, then gravel pack slurry 63 is diverted into the shunt tubes of the alternate-path technology 21 and resumes packing the open-hole annulus 45 between the alternate path technology 21 and the wellbore walls of the open-hole section 24 and below the sand bridge 81. The arrows 86 illustrate the fluid flow of the gravel pack slurry 63 down the drillpipe 28 through the crossover tool 35 into the annulus of the wellbore below the GP Packer 29 through the alternate-path technology 21 to the open-hole annulus 45 between the alternate path technology 21 and the wellbore walls of the open-hole section 24 and below the sand bridge 81. The arrows 86 further indicate the fluid flow of the neat gravel pack fluid 33 up the washpipe 41 through the crossover tool 35 in the annulus between the casing 22 and the drillpipe 28.

Figure 9:
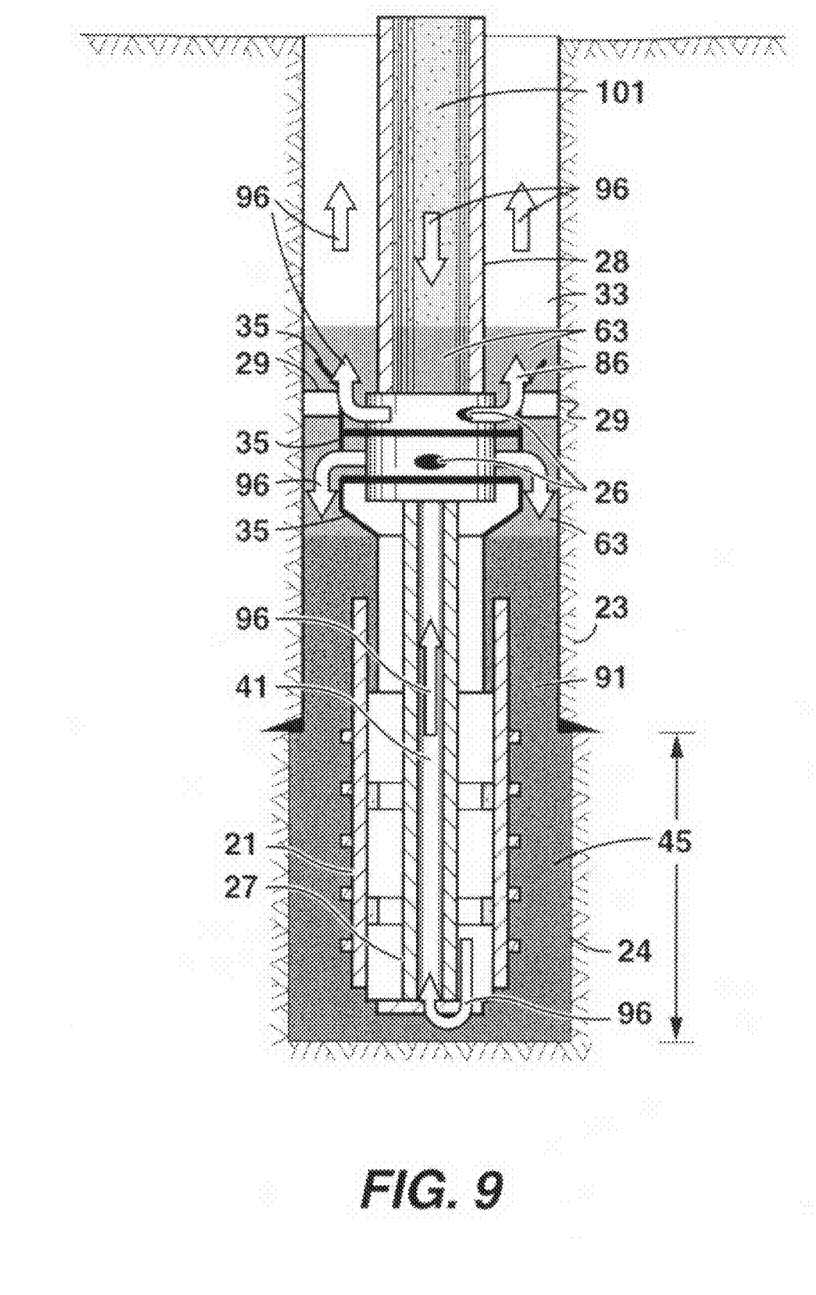
FIG. 9 is an illustration of a wellbore with a gravel pack using a two-fluid system illustrating the displacement of the gravel pack slurry with a completion-fluid until screen-out occurs.

FIG. 9 illustrates a wellbore 23 immediately after fully packing the annulus between the screen 27 and casing 22 below the GP packer 29. Once the screen 27 is covered with sand 91 and the shunt tubes of the alternate path technology 21 are full of sand, the drillpipe 28 fluid pressure increases, which is known as a screenout. The arrows 96 illustrate the fluid flowpath as the gravel pack slurry 63 and the neat gravel pack fluid 33 is displaced by completion fluid 101.

Figure 10:
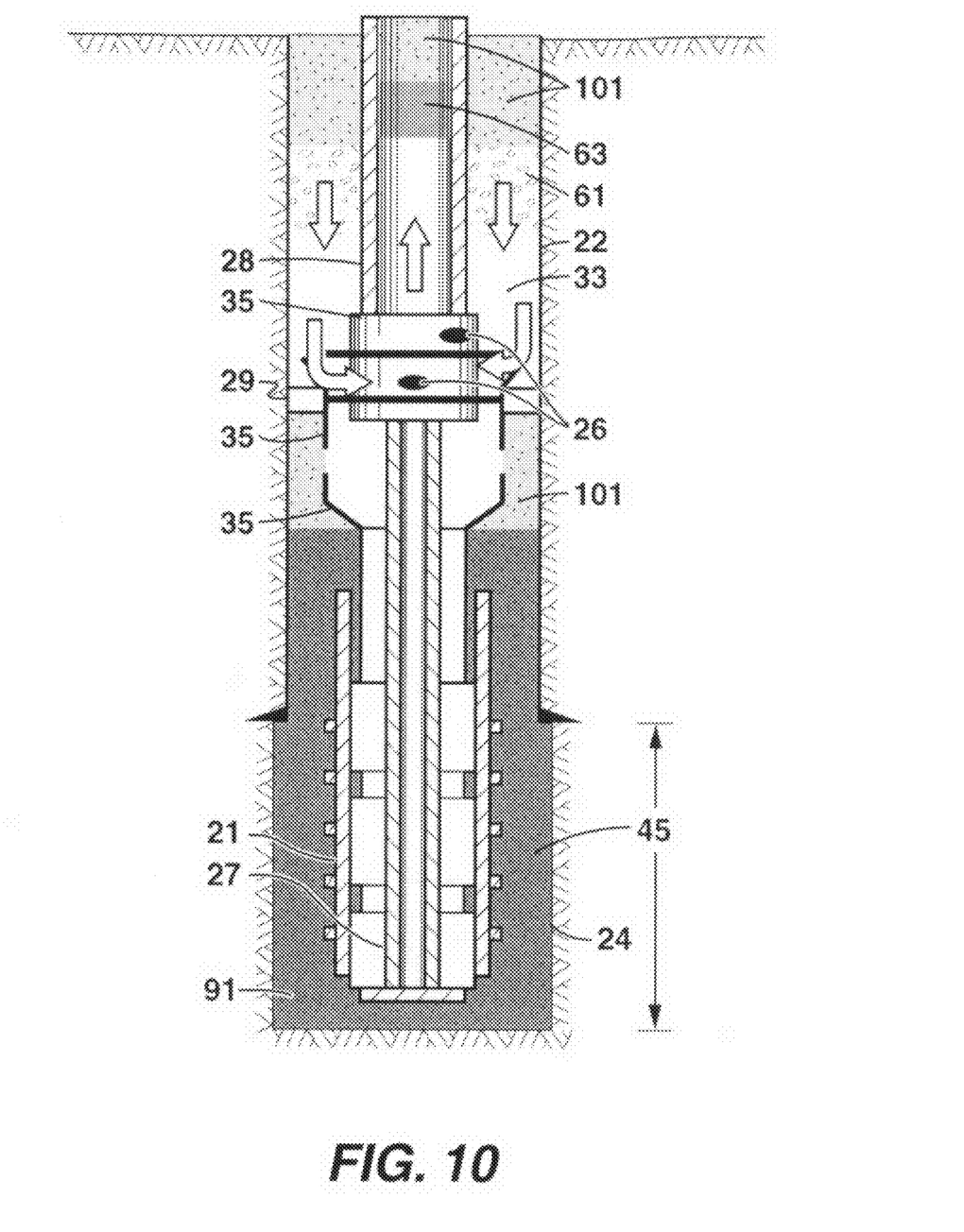
FIG. 10 is an illustration of a wellbore with a gravel pack using a two-fluid system illustrating the reverse position of the crossover tool with completion fluid pumped into the annulus and a reverse-out of the excess sand and gravel pack fluid from the drill pipe.

As illustrated in FIG. 10, after a screenout occurs, the crossover tool 35 is shifted to the reverse position. A viscous spacer 61 is pumped down the annulus between the drillpipe 28 and the casing 22 followed by completion fluid 101 down the annulus between the casing 22 and the drillpipe 28. Thus, creating a reverse-out by pushing the remaining gravel pack slurry 63 and neat gravel pack fluid 33 out of the drillpipe 28.

Figure 11:
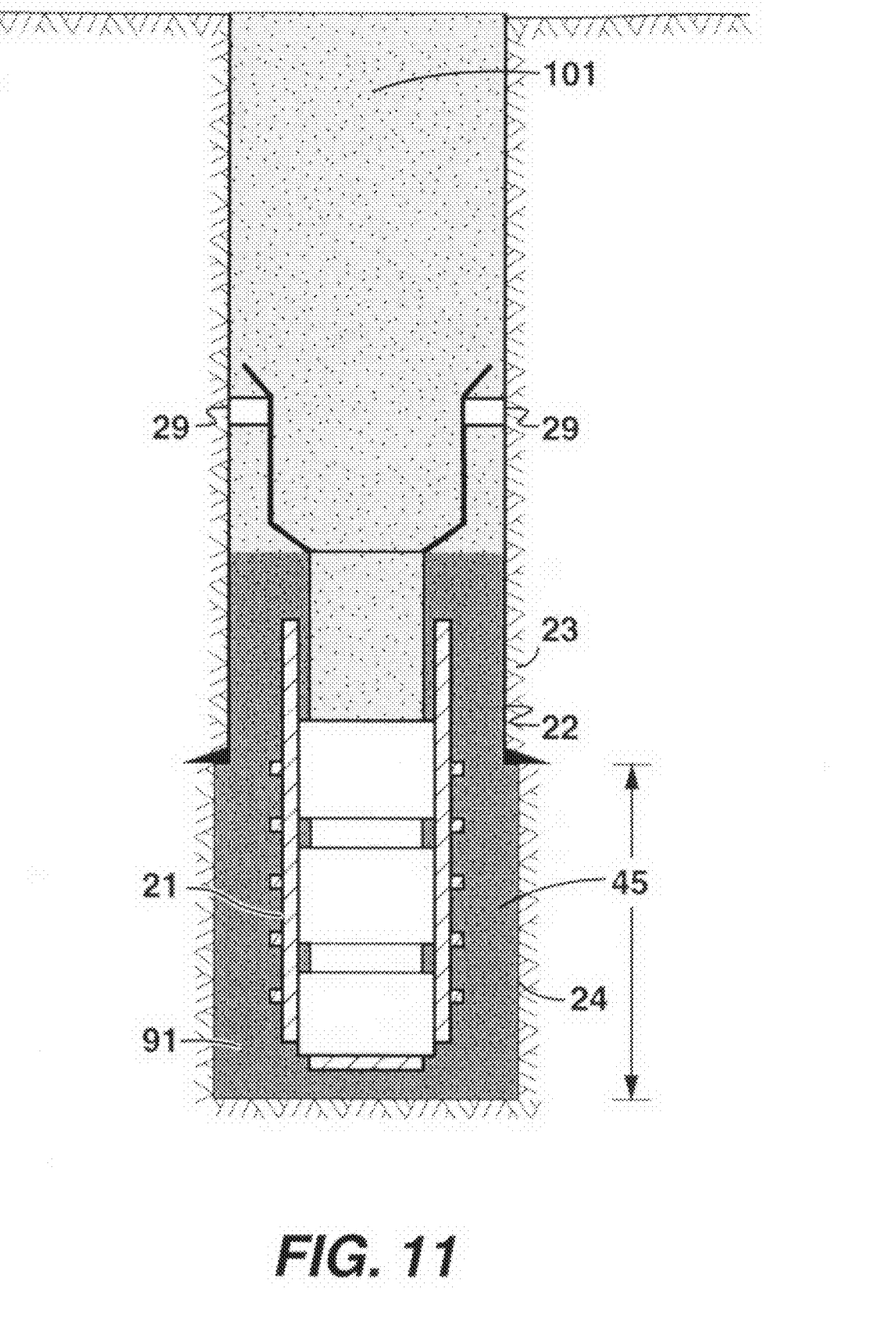
FIG. 11 is an illustration of a wellbore with a gravel pack using a two-fluid system illustrating a complete gravel pack of the openhole interval, a well fully displaced to completion fluid and the gravel pack assembly pulled out of the wellbore.

Finally, as shown in FIG. 11, the fluid in the annulus between the casing 22 and the drillpipe 28 has been displaced with completion fluid 101, and the crossover tool (not shown) and drillpipe (not shown) are pulled out of the wellbore 23 leaving behind a fully-packed well interval below the GP Packer 29.

Laboratory testing was conducted to qualify the inventive method described above before the method was field-tested. Laboratory testing indicated that the solids contamination of a gravel pack potential result of an inefficient displacement of solids laden drilling fluid) does not impair the pack permeability. The test involved mixing a volume of gravel with a volume of drilling fluid and packing the mixture into a cylindrical flow apparatus. The drilling fluid was displaced from the gravel by flowing another fluid through the pack. Measurements of the permeability of the initial gravel pack not previously mixed with solids-laden drilling fluid and measurements of the gravel pack after the drilling fluid had been displaced from the pack were similar indicating negligible potential for impairment. In addition, to the laboratory test, the successful field trial, described above verified the feasibility of the procedures described above. The procedures include fluid conditioning procedures, field testing apparatus procedures to monitor the conditioning process and the manipulation procedures (reverse and circulating positions) of gravel pack service tools described above. Furthermore, the fluid displacement efficiencies of using solids-laden drilling fluid and gravel carrier fluids with sand screens in the wellbore were also verified.

What is claimed is:

1. A method for drilling and completing a gravel packed well comprising:
   drilling a wellbore through a subterranean formation with a solids-laden oil-based drilling fluid;
   conditioning the drilling fluid;
   running a gravel packing assembly tool and a sand screen in the wellbore, disposing the gravel packing assembly tool and the sand screen in the conditioned drilling fluid; and
   gravel packing an interval of the wellbore with a carrier fluid.

2. The method of claim 1 wherein the carrier fluid is the conditioned drilling fluid.

3. The method of claim 1 wherein the conditioning of the drilling fluid removes solid particles larger than approximately one-third the slot opening size of the sand screen.

4. The method of claim 1 wherein the conditioning of the drilling fluid removes solids particles larger than one-sixth the diameter of the gravel pack particle size.

5. The method of claim 1 wherein the sand screen comprises alternate-path technology.

6. The method of claim 1 wherein the carrier fluid is a fluid viscosified with at least one of HEC polymer, xanthan polymer, visco-elastic surfactant, and any combination thereof.

7. The method of claim 1 wherein the carrier fluid has favorable rheology to effectively displace the conditioned drilling fluid.

8. The method of claim 6 wherein the carrier fluid has favorable rheology and sand carrying capacity for gravel packing the interval of the wellbore using alternate path technology.

9. A method for drilling and completing a gravel packed well comprising:
drilling a wellbore through a subterranean formation with a solids-laden water-based drilling fluid;
conditioning the drilling fluid;
running a gravel packing assembly tool and a sand screen in the wellbore, disposing the gravel packing assembly tool and the sand screen in the conditioned drilling fluid; and
gravel packing an interval of the wellbore with a carrier fluid.

10. The method of claim 9 wherein the carrier fluid is the conditioned drilling fluid.

11. The method of claim 9 wherein the conditioning of the drilling fluid removes solid particles larger than approximately one-third the slot opening size of the sand screen.

12. The method of claim 9 wherein the conditioning of the drilling fluid removes solid particles larger than one-sixth the diameter of the gravel pack particle size.

13. The method of claim 9 wherein the sand screen comprises alternate-path technology.

14. The method of claim 9 wherein the carrier fluid is a fluid viscosified with at least one of HEC polymer, xanthan polymer, visco-elastic surfactant, and any combination thereof.

15. The method of claim 9 wherein the carrier fluid has favorable rheology to effectively displace the conditioned drilling fluid.

16. The method of claim 14 wherein the carrier fluid has favorable rheology and sand carrying capacity for gravel packing the interval of the wellbore using alternate path technology.

17. A method comprising:
conditioning a solids-laden oil-based drilling fluid utilized to access a subterranean formation via a wellbore;
disposing a sand screen in the conditioned drilling fluid within an interval of the wellbore;
displacing the conditioned drilling fluid adjacent to the sand screen with a carrier fluid;
gravel packing the interval of the wellbore with the carrier fluid; and
producing subterranean fluid from the subterranean formation via the wellbore.

18. The method of claim 17 wherein the conditioning of the drilling fluid removes solid particles larger than approximately one-third the slot opening size of the sand screen.

19. The method of claim 17 the conditioning of the drilling fluid removes solid particles larger than approximately 50 microns.

20. The method of claim 17 wherein the carrier fluid comprises a fluid viscosified with HEC polymer.

21. The method of claim 17 wherein the carrier fluid comprises a fluid viscosified with xanthan polymer.

22. The method of claim 17 wherein the carrier fluid comprises a fluid viscosified with visco-elastic surfactant.

23. The method of claim 17 wherein the carrier fluid has favorable rheology and sand carrying capacity for gravel packing the interval of the wellbore using alternate path technology.

24. The method of claim 17 comprising disposing a gravel packing service tool in the conditioned drilling fluid associated with the sand screen.

25. The method of claim 24 comprising manipulating the gravel packing service tool to displace the conditioned drilling fluid from around the sand screen with the carrier fluid.

26. The method of claim 25 wherein manipulating comprises shifting the gravel packing service tool into one of a reverse position and a circulating position.

27. The method of claim 17 wherein the subterranean fluid comprises hydrocarbons.

28. A method comprising:
conditioning a solids-laden water-based drilling fluid utilized to access a subterranean formation via a wellbore;
disposing a sand screen in the conditioned drilling fluid within an interval of the wellbore;
displacing the conditioned drilling fluid adjacent to the sand screen with a carrier fluid;
gravel packing the interval of the wellbore with the carrier fluid; and
producing subterranean fluid from the subterranean formation via the wellbore.

29. The method of claim 28 wherein the conditioning of the drilling fluid removes solid particles larger than approximately one-third the slot opening size of the sand screen.

30. The method of claim 28 wherein the conditioning of the drilling fluid removes solid particles larger than approximately 50 microns.

31. The method of claim 28 wherein the carrier fluid is a fluid viscosified with at least one of HEC polymer, xanthan polymer, visco-elastic surfactant, and any combination thereof.

32. The method of claim 28 wherein the carrier fluid has favorable rheology and sand carrying capacity for gravel packing the interval of the wellbore using alternate path technology.

33. The method of claim 28 further comprising disposing a gravel packing service tool in the conditioned drilling fluid associated with the sand screen.

34. The method of claim 33 comprising manipulating the gravel packing service tool to displace the conditioned drilling fluid from around the sand screen with the carrier fluid.

35. The method of claim 34 wherein manipulating comprises shifting the gravel packing service tool into one of a reverse position and a circulating position.

36. The method of claim 28 wherein the subterranean fluid comprises hydrocarbons.

37. A method comprising:
conditioning drilling fluid utilized to access a subterranean formation via a wellbore;
disposing a sand screen in the conditioned drilling fluid below a packer within an interval of the wellbore;
gravel packing the interval of the wellbore with a fluid viscosified with HEC polymer; and
producing hydrocarbons from the subterranean formation via the wellbore.

38. The method of claim 37 wherein the fluid viscosified with HEC polymer displaces the conditioned drilling fluid.

39. The method of claim 37 wherein the fluid viscosified with HEC polymer has favorable rheology and sand carrying capacity for gravel packing the interval of the wellbore.

40. A method comprising:
conditioning drilling fluid utilized to access a subterranean formation via a wellbore;
disposing a sand screen in the conditioned drilling fluid below a packer within an interval of the wellbore;
gravel packing the interval of the wellbore with a fluid viscosified with xanthan polymer; and producing hydrocarbons from the subterranean formation via the wellbore.

41. The method of claim 40 wherein the fluid viscosified with xanthan polymer displaces the conditioned drilling fluid from the sand screen below the packer and adjacent to the sand screen with alternate path technology.

42. The method of claim 40 wherein the fluid viscosified with xanthan polymer has favorable rheology and sand carrying capacity for gravel packing the interval of the wellbore.

43. A method comprising:
conditioning drilling fluid utilized to access a subterranean formation via a wellbore;
disposing a sand screen in the conditioned drilling fluid below a packer within an interval of the wellbore;
gravel packing the interval of the wellbore with a fluid viscosified with visco-elastic surfactant; and
producing hydrocarbons from the subterranean formation via the wellbore.

44. The method of claim 43 wherein the fluid viscosified with visco-elastic surfactant displaces the conditioned drilling fluid from the sand screen below the packer and adjacent to alternate path technology.

45. The method of claim 43 wherein the fluid viscosified with visco-elastic surfactant has favorable rheology and sand carrying capacity for gravel packing the interval of the wellbore.

46. A method comprising:
disposing a gravel packing service tool assembly comprising a sand screen in conditioned drilling fluid below a packer in a wellbore;
manipulating the gravel packing service tool assembly;
displacing the conditioned drilling fluid from around the sand screen and below the packer with a carrier fluid; and
providing gravel with the carrier fluid to an interval of the wellbore.

47. The method of claim 46 wherein the carrier fluid is a fluid viscosified with visco-elastic surfactant.

48. The method of claim 46 wherein the carrier fluid comprises a fluid viscosified with HEC polymer.

49. The method of claim 46 wherein the carrier fluid comprises a fluid viscosified with xanthan polymer.

50. The method of claim 46 wherein the gravel packed interval is utilized to produce hydrocarbons from the well.

51. The method of claim 46 wherein properties of the carrier fluid reduce the loss of filter cake disposed within an interval during gravel packing.

52. A method comprising:
disposing a gravel packing service tool assembly in a wellbore having conditioned drilling fluid, wherein the gravel packing service tool assembly comprises a sand screen and a packer;
pumping a carrier fluid into the wellbore to displace the conditioned drilling fluid below the packer and around the sand screen.

53. The method of claim 52 comprising manipulating the gravel packing service tool assembly to set the packer within the wellbore in the conditioned drilling fluid.

54. The method of claim 52 further comprising filtering drilling fluid over mesh shakers to form the conditioned drilling fluid.

55. The method of claim 54 wherein the filtering of the drilling fluid removes solid particles larger than approximately one-third the slot opening size of the sand screens.

56. The method of claim 54 wherein the filtering of the drilling fluid removes solid particles larger than approximately 50 microns.

57. The method of claim 52 further comprising pumping the carrier fluid with gravel into the wellbore to displace conditioned drilling fluid above the packer.

58. The method of claim 57 further comprising manipulating the gravel packing service tool assembly into a circulate position to dispose the gravel below the packer and between the sand screen and the walls of the wellbore.

59. The method of claim 58 further comprising pumping at least a portion of the carrier fluid through the sand screen and above the packer.

60. The method of claim 52 wherein the carrier fluid comprises a fluid viscosified with HEC polymer.

61. The method of claim 52 wherein the carrier fluid comprises a fluid viscosified with xanthan polymer.

62. The method of claim 52 wherein the carrier fluid is a fluid viscosified with visco-elastic surfactant.

63. The method of claim 52 further comprising producing hydrocarbons from the wellbore via the sand screen.

* * * * *